(12) United States Patent
Szlam

(10) Patent No.: US 8,065,168 B2
(45) Date of Patent: Nov. 22, 2011

(54) METHOD, SYSTEM AND COMPUTER PROGRAM CODE FOR AUTOMATICALLY GENERATING SOFTWARE FOR REFORMATTING INCOMING DATA

(75) Inventor: Aleksander Szlam, Norcross, GA (US)

(73) Assignee: ACS State and Local Solutions, Inc., Washington, DC (US)

( * ) Notice: Subject to any disclaimer, the term of this patent is extended or adjusted under 35 U.S.C. 154(b) by 1060 days.

(21) Appl. No.: 11/412,001

(22) Filed: Apr. 25, 2006

(65) Prior Publication Data

US 2007/0250351 A1     Oct. 25, 2007

(51) Int. Cl.
*G06Q 40/00* (2006.01)
(52) U.S. Cl. ............ 705/4; 704/9; 707/3; 707/100; 709/236; 713/100; 717/106; 717/107; 717/109; 717/110; 717/122; 717/136; 717/137; 717/138; 717/151; 717/170; 717/174
(58) Field of Classification Search .......... 705/35–45, 705/4
See application file for complete search history.

(56) References Cited

U.S. PATENT DOCUMENTS

| | | | | |
|---|---|---|---|---|
| 5,390,314 | A | * | 2/1995 | Swanson ............ 717/138 |
| 5,450,545 | A | * | 9/1995 | Martin et al. ........ 717/109 |
| 5,701,400 | A | | 12/1997 | Amado |
| 5,745,687 | A | | 4/1998 | Randell |
| 5,768,506 | A | | 6/1998 | Randell |
| 5,892,947 | A | | 4/1999 | DeLong et al. |
| 6,088,677 | A | * | 7/2000 | Spurgeon ............ 705/4 |
| 6,167,562 | A | | 12/2000 | Kaneko |
| 6,247,128 | B1 | * | 6/2001 | Fisher et al. ........ 713/100 |
| 6,289,513 | B1 | | 9/2001 | Bentwich |
| 6,338,093 | B1 | | 1/2002 | DiRienzo |

(Continued)

FOREIGN PATENT DOCUMENTS

EP     1610253     * 12/2005

OTHER PUBLICATIONS

Tvete, et al. A comparison of an analytical approach and a standard simulation Approach in Bayesian Forecasting Applied to Monthly Data from Insurance of Companies. Methodology and Computing in Applied Probability vol. 4, No. 1, 95-113, DOI: 10.1023/A:1015761615492. © 2002.*

(Continued)

*Primary Examiner* — Charles Kyle
*Assistant Examiner* — Robert R Niquette
(74) *Attorney, Agent, or Firm* — Alston & Bird LLP

(57) ABSTRACT

A method, system and computer program product are provided for creating software that can be used to reformat incoming insurance-related data into a format that conforms to the requirements or preferences of the receiving party. In particular, the software generated is capable of causing a particular action to be taken which will result in the transfer of the received data from one format to another in response to certain conditions being met. These conditions are defined by a decision table, from which the software is automatically generated. A means is further provided for using the received data, which has been reformatted where necessary, to create a user-friendly table that defines the rules and parameters of a particular insurance policy. The table is capable of being easily understood by those unfamiliar with the intricacies of insurance claim processing and programming code, and is further capable of being read by a claims processing engine when processing an insurance claim.

23 Claims, 5 Drawing Sheets

U.S. PATENT DOCUMENTS

| | | | |
|---|---|---|---|
| 6,343,310 B1 | 1/2002 | DiRienzo | |
| 6,490,719 B1* | 12/2002 | Thomas | 717/107 |
| 6,505,341 B1 | 1/2003 | Harris et al. | |
| 6,553,429 B1 | 4/2003 | Wentz et al. | |
| 6,556,951 B1 | 4/2003 | Deleo et al. | |
| 6,698,010 B1* | 2/2004 | Yamanouchi et al. | 717/106 |
| 6,728,947 B1 | 4/2004 | Bengston | |
| 6,792,595 B1* | 9/2004 | Storistenau et al. | 717/110 |
| 7,013,298 B1* | 3/2006 | De La Huerga | 1/1 |
| 7,272,815 B1 | 9/2007 | Eldridge et al. | |
| 7,322,030 B1* | 1/2008 | Boodro et al. | 717/170 |
| 7,356,460 B1* | 4/2008 | Kennedy et al. | 704/9 |
| 7,392,162 B1 | 6/2008 | Srinivasan et al. | |
| 7,653,893 B2 | 1/2010 | Neumann et al. | |
| 2002/0035488 A1 | 3/2002 | Aquila et al. | |
| 2003/0172367 A1* | 9/2003 | Kannenberg | 717/101 |
| 2003/0182172 A1 | 9/2003 | Claggett et al. | |
| 2004/0205731 A1* | 10/2004 | Junkermann | 717/136 |
| 2004/0215494 A1 | 10/2004 | Wahlbin et al. | |
| 2005/0060184 A1 | 3/2005 | Wahlbin | |
| 2005/0192850 A1 | 9/2005 | Lorenz | |
| 2006/0020602 A9* | 1/2006 | Morgan et al. | 707/100 |
| 2007/0011654 A1* | 1/2007 | Opperman | 717/122 |
| 2007/0079305 A1* | 4/2007 | Duerinckx | 717/151 |
| 2007/0100669 A1* | 5/2007 | Wargin et al. | 705/4 |
| 2007/0157196 A1* | 7/2007 | Goicea et al. | 717/174 |
| 2008/0059947 A1* | 3/2008 | Anand et al. | 717/107 |
| 2008/0082683 A1* | 4/2008 | DelloStritto et al. | 709/236 |
| 2008/0229290 A1* | 9/2008 | Jones et al. | 717/137 |
| 2009/0125130 A1 | 5/2009 | Eldridge et al. | |

OTHER PUBLICATIONS

Litoiu et al., A Performance Engineering Tool and Method for Distributing Applications, Nov. 1997, pp. 1-14, ACM.

Talbott et al., A Collaborative Methodology for the Rapid Development and Delivery of Online Courses, Oct. 2002, pp. 216-225, ACM.

Non-Final Office Action dated Nov. 2, 2009 from U.S. Appl. No. 11/412,156.

Notice of Allowance dated Apr. 2, 2010 from U.S. Appl. No. 11/412,156.

Notice of Allowance Action for corresponding U.S. Appl. No. 11/412,156 dated Aug. 11, 2010.

* cited by examiner

Action = Transfer data from this field to another field

| Condition | | | | | | | | |
|---|---|---|---|---|---|---|---|---|
| 1 | Y | N | Y | Y | N | N | Y | N |
| 2 | Y | Y | N | Y | N | Y | N | N |
| 3 | Y | Y | Y | N | Y | N | N | N |
| Result | | | | | | | | |
| Action | Y | | Y | | Y | | Y | |

METHOD, SYSTEM AND COMPUTER PROGRAM CODE FOR AUTOMATICALLY GENERATING SOFTWARE FOR REFORMATTING INCOMING DATA

FIELD OF THE INVENTION

Exemplary embodiments of the present invention relate generally to reformatting incoming data, and more particularly, to automatically generating software capable of reformatting incoming insurance-related data. Exemplary embodiments further relate to processing insurance claims using the insurance-related data.

BACKGROUND OF THE INVENTION

In many cases, insurance providers will contract with other companies to process the numerous insurance claims submitted by customers of the insurance provider. These companies, referred to as "insurance processors," will receive policy information from the various insurance providers and then use this information to process the incoming claims. The policy information received may include, for example, information relating to one or more authorized providers (e.g., specific medical doctors or facilities, psychiatrists, etc.), the different benefits provided, and/or various eligibility requirements for each of the respective insurance policies offered by the insurance provider.

Because the insurance processor receives policy information from multiple sources (e.g., different insurance providers), it is often the case that the insurance processor will receive information in many different formats; each source, for example, having a different format for the policy information provided. For example, one insurance provider may designate the authorized providers using a five-digit numeric code. By contrast, another may use a seven-digit alphanumeric code. In addition, various insurance providers may have different ways of describing the fee schedule or method of calculating the benefit.

When an insurance processor receives policy information from various sources in various formats, it would be beneficial, and perhaps may even be necessary, for the insurance processor to be able to put all of the received information into a consistent format. The insurance processor may select a format that is used by a majority of the insurance providers, if such a format exists, or the insurance processor may have a particular format that is preferred or even necessary for use with the insurance processor's system.

A need, therefore, exists for enabling the insurance processor to efficiently and consistently reformat received insurance-related data into a consistent format that can be used when processing incoming insurance claims.

In addition, the policy information received by an insurance processor, such as the list of authorized providers and/or the various benefits and eligibility requirements, will often be in the form of, or in addition to, a set of complex rules and parameters to be used when processing the submitted insurance claims. These rules and parameters may be used to determine, for example, if the service on the claim is covered by the policy for the particular recipient, if there is a copay, coinsurance or other penalty, if the service is in or out of network, and/or which pricing methodology/fee schedule should be used to compute the allowed charges.

In a typical scenario, each parameter or rule of each insurance policy for each insurance provider would need to be translated into its own coding structure, or set of computer programming instructions. This can be very time consuming. Processing an insurance claim would then require running each set of computer programming instructions sequentially. In addition to being time consuming, this process may prevent a person who is unfamiliar with programming languages to ascertain whether or not the rule or parameter has been accurately translated. It further makes it difficult for the various rules or parameters to be changed at a later point in time, since this would likely require retranslating the entire rule or parameter into a new set of computer programming instructions.

A need, therefore, exists for an improved process of receiving incoming insurance policy information and converting the information, if necessary, into a format that can be easily understood and, if necessary, changed, yet still capable of being used by a claims processing engine when processing a submitted insurance claim.

BRIEF SUMMARY OF THE INVENTION

Generally described, exemplary embodiments of the present invention provide an improvement over the known prior art by, among other things, providing a method, system and computer program product for creating software that can be used to reformat incoming insurance-related data into a format that conforms to the requirements or preferences of the receiving party. In particular, the software generated is capable of causing a particular action to be taken which will result in the transfer of the received data from one format to another in response to certain conditions being met. These conditions are defined by a decision table, from which the software is automatically generated. Exemplary embodiments of the present invention further provide a means for using the incoming insurance-related data, which has been reformatted where necessary, to create a user-friendly table that defines the rules and parameters of a particular insurance policy. The table is capable of being easily understood by those unfamiliar with the intricacies of insurance claim processing and programming code, and is further capable of being read by a claims processing engine when processing an insurance claim.

According to one aspect of the present invention a method is provided for creating software for reformatting insurance-related data received from a first party to a format that is acceptable to a second party. In one exemplary embodiment, the method includes: (1) creating a decision table based on a combination to conditions defining when a respective one of a plurality of reformatting actions should be taken with respect to the data received; (2) providing the decision table to a software generator; and (3) automatically generating computer programming instructions based upon the decision table and configured to cause the respective reformatting action to be taken based on the combination of conditions from the decision table upon execution thereof.

In one exemplary embodiment, a first party offers one or more insurance policies to one or more third parties, and a second party processes insurance claims submitted by the third parties under the insurance policies. In this embodiment, the insurance-related data may include data relating to one or more providers authorized under a respective insurance policy offered by the first party. Alternatively, the insurance-related data may include data relating to one or more benefits under a respective insurance policy offered by the first party, or data relating to one or more eligibility requirements for respective insurance policies.

In one exemplary embodiment, creating a decision table is repeated for each of the plurality of reformatting actions, such that a different decision table is created for each reformatting action based on a different combination of conditions defining when the reformatting action, with which the decision table is associated, should be taken. The method of this exemplary embodiment may further include repeatedly providing the decision table to the software generator for each of the decision tables created. In this case, for each of the different decision tables, a different set of computer programming instructions is automatically generated that causes the respective reformatting action, with which the decision table is associated, to be taken based on the combination of conditions from the decision table.

According to another aspect of the invention, a system is provided for creating software for reformatting insurance-related data received from a first party to a format that is acceptable to a second party. In one exemplary embodiment, the system includes a software generator and a decision table. The decision table, which is instantiated in a memory device and accessible by the software generator, defines a combination of conditions that must occur in order for a respective one of a plurality of reformatting actions to be taken with respect to the data received. The software generator automatically generates computer programming instructions based upon the decision table and configured to cause the respective reformatting action to be taken based on the combination of conditions from the decision table upon execution thereof.

According to yet another aspect of the invention, a computer program product is provided for creating software for reformatting insurance-related data received from a first party to a format that is acceptable to a second party. The computer program product includes at least one computer-readable storage medium having computer-readable program code portions stored therein. In one exemplary embodiment, the computer-readable program code portions include: (1) a first executable portion for receiving a decision table that defines a combination of conditions that must occur for a respective one of a plurality of reformatting actions to be taken with respect to the data received; and (2) a second executable portion for automatically generating computer programming instructions based upon the decision table and configured to cause the respective reformatting action to be taken based on the combination of conditions from the decision table upon execution thereof.

According to another aspect of the present invention, a method is provided for processing an insurance claim. In one exemplary embodiment, the method includes: (1) receiving policy information associated with a particular insurance policy, wherein the policy information comprises a plurality of rules that define one or more benefits under the insurance policy; (2) organizing the plurality of rules into a predefined tabular format; (3) providing a claims processing engine with the organized plurality of rules; and (4) thereafter processing the insurance claim in accordance with the plurality of rules.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a decision table which may be defined for each of a plurality of actions to be taken when reformatting incoming insurance-related data and from which software may be automatically generated in accordance with exemplary embodiments of the present invention;

FIG. 5 illustrates a user-friendly table created in accordance with exemplary embodiments of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
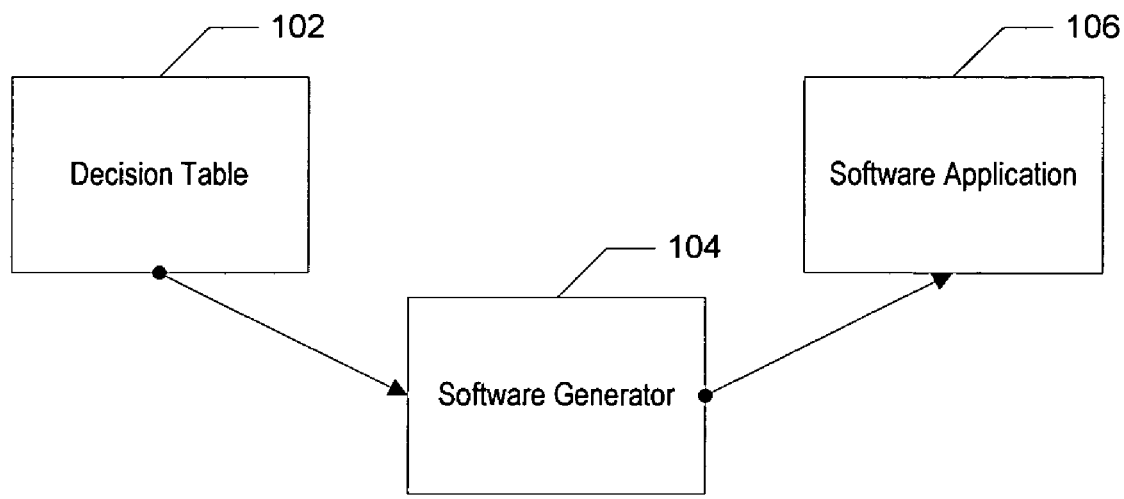
FIG. 1 illustrates a system which may be used in accordance with exemplary embodiments of the present invention.

Reference is now made to FIG. 1, which very generally illustrates a system in which exemplary embodiments of the present invention may be implemented. As shown, the system may include a decision table 102, which may be stored in a memory device and an example of which is illustrated in FIG. 3. The decision table 102 defines a set of conditions that must be met in order for a particular action to be taken with respect to incoming insurance-related data. As is discussed in more detail below, an insurance processing company (hereinafter "an insurance processor") may receive data from one or more customers (i.e., insurance providers) that define the insurance policies offered by those customers. For example, the data may define the authorized providers, the available benefits and/or the eligibility requirements for each policy offered. The data received from the various customers is likely in a format that is particular to each customer. For example, one customer may use provider ID numbers that are five digits long, while another uses provider ID numbers that are six digits long. In some instances none of these formats conform to the format preferred, or at least predefined, by the insurance processor (e.g., the insurance processor may use a 10-digit provider ID).

It would, therefore, be advantageous for the insurance processor to be able to reformat the incoming insurance-related data to its predefined format. Doing so may require that certain actions be taken with respect to the incoming data. For example, one action may be to change the provider IDs. The change may be based on a database maintained by the insurance processor that correlates the provider IDs used by its customers to those used by the insurance processor. Other examples of actions to be taken will be readily apparent to those of ordinary skill in the art, such as moving information contained in one field from an input to an output, or vice versa, translating data in a particular field from one format to another, left or right justifying data in one or more fields, removing dollar signs ($), filling in particular data fields with leading or ending zeros, or converting leading or ending zeros to spaces. In order to effect a change (or other action) at the appropriate time, such as the reformatting of certain incoming data, a set of conditions is first defined and then combined in a manner that dictates when the action will be taken. It is this combination of conditions that is defined by the decision table 102. Once the decision table has been defined and stored, it is fed into a software generator 104, which automatically generates a software application 106, which can then be executed to evaluate incoming data in order to take actions that will effect a format change of the data where applicable. A software generator 104 is a computing application including or capable of accessing the decision table 102 in memory. The software generator 104 is capable of translating a set of instructions implied by the decision table 102 into a computer executable set of instructions (i.e., the software application 106) and storing that set of instructions or application for future execution. Either the same or a different computing application is capable of executing the software application 106, which is stored in the same or different memory device. In general, therefore, the software generator 104 is a computer program or set of computer executable instructions configured to create another set of computer executable instructions (i.e., the software application 106) from a set of parameters (i.e., derived from the decision table 102).

Figure 2:
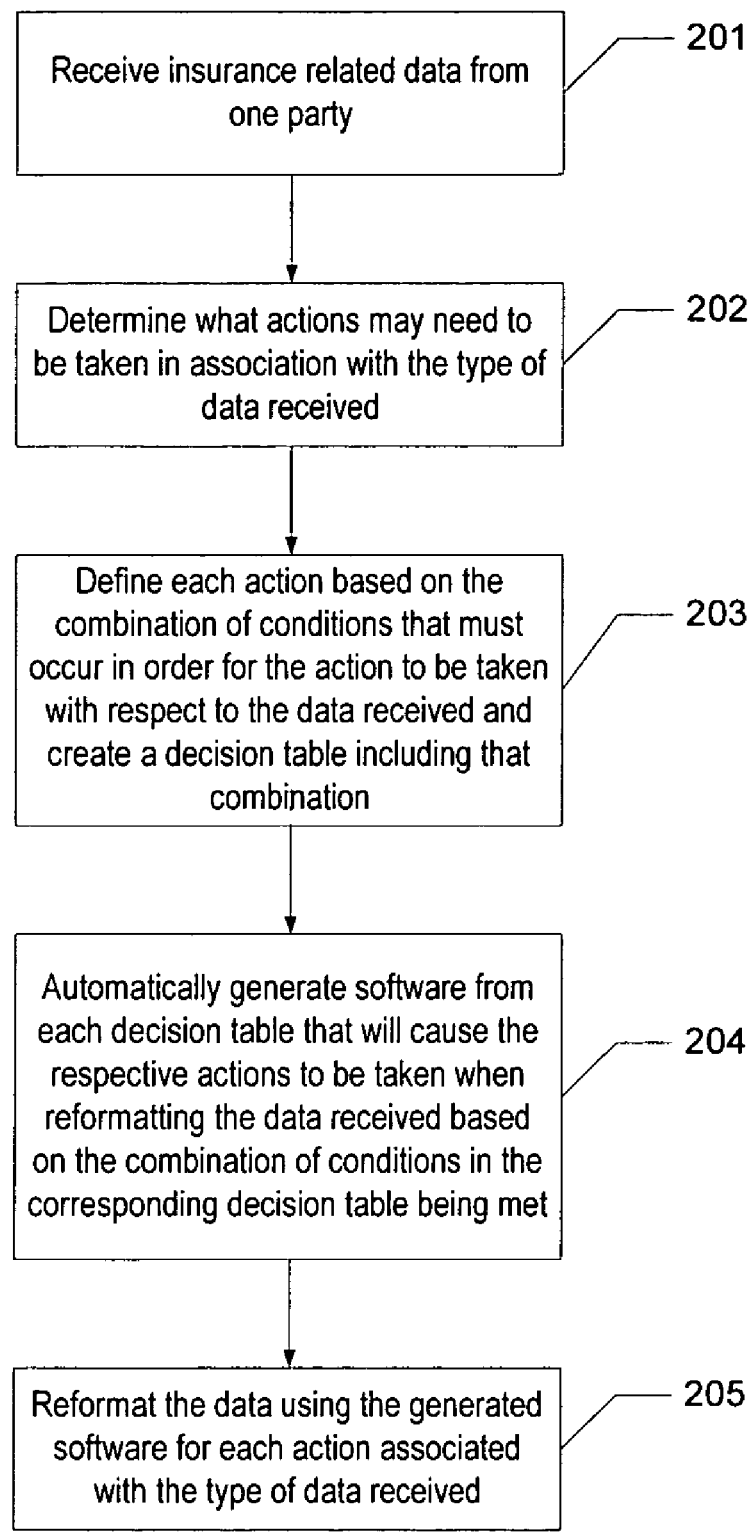
FIG. 2 is a flow chart illustrating a method of generating software to be used for reformatting incoming insurance-related data in accordance with exemplary embodiments of the present invention.

FIG. 2 illustrates in more detail the steps which may be taken in exemplary embodiments of the present invention when generating software for reformatting incoming insurance-related data. As shown, the first step, Step 201, may be to receive the insurance-related data from a first party (e.g., one of several insurance providers for which the insurance processor processes incoming insurance claims). It may then be determined, in Step 202, which actions may need to be taken with respect to the type of data received. For example, where different field sizes are used, varying provider IDs are used, or where it is necessary that specific fields be populated in order to function within the insurance processor's system, specific actions relating to each of these inconsistencies in data will need to be taken. For example, where different field sizes are used, the information contained in a field may need to be truncated or, alternatively, to have one or more spacers (e.g., leading or ending zeroes) added to it. As discussed above, another action which may be taken may be to access a database that correlates various values (e.g., provider ID numbers) used by a customer to those predefined by the claims processor.

Once it is determined which potential actions may need to be taken with respect to the received data, the next step, Step 203 is to define each action. In general, this step includes first defining various conditions that must be met in order for the action to be taken and then creating a decision table which reflects these conditions. In particular, in one exemplary embodiment, the action is described by defining a set of conditions using various data fields from within the data received. Each condition may include, for example, a field name plus a predicate. The predicate may consist of a comparison (e.g., <, >, =, IN, etc.) plus (1) another field name, (2) a constant or fixed value, (3) a simple computation (e.g., the sum of various fields), (4) a list number (in the instance where the comparison is IN), or (5) a system parameter. For example, the condition may be defined as Provider ID (i.e., a field name)<(i.e., a comparison) 10 digits (i.e., a constant or fixed value).

A decision table, like the one illustrated in FIG. 3, can then be generated for each action based on a combination of such conditions. To illustrate, in the example shown in FIG. 3, Conditions 1, 2 and 3 were defined, for example, in the above-described manner. These conditions are then combined in the decision table to indicate that data from a particular field should be moved to another field when: (1) conditions 1, 2 and 3 are all met; (2) conditions 1 and 3, but not 2, are met; (3) condition 3, but not 1 or 2, is met; and (4) condition 1, but not 2 or 3, is met. As shown, all other combinations of conditions 1, 2 and 3 do not cause the action to be taken (i.e., they do not cause the data to be moved from a particular field to another).

A software application can then be automatically generated, in Step 204 from each decision table. As will be recognized by those of ordinary skill in the art, the software application may be written in any programming language, such as Java, XML, or Cobalt. The generated software application, when applied to the insurance-related data received, will cause each of the defined actions to take place in the instance where the appropriate conditions are met, as defined by the decision table. In particular, the software generator writes additional software that causes the evaluation defined in the decision table to be performed upon execution. By way of example, the software generator effectively creates a series of if-then statements that effectuate the decision table. With reference to the decision table of FIG. 3, for example, the software generator would generate software equivalent to the following pseudocode, albeit in the programming language of choice:

```
IF (COND 1 = Y) AND (COND 2 = Y) AND (COND 3 = Y),
    THEN ACTION = Y
ELSE,
IF (COND 1 = Y) AND (COND 2 = N) AND (COND 3 = Y),
    THEN ACTION = Y
ELSE,
IF (COND 1= N) AND (COND 2 = N) AND (COND 3 = Y),
    THEN ACTION = Y
ELSE,
IF (COND 1 = Y) AND (COND 2 = N) AND (COND 3 = N),
    THEN ACTION = Y
ELSE, ACTION = N
```

Finally, once a software application has been generated for each action, in Step 205, the software will be applied to the received insurance-related data, which will consequently be reformatted to the format preferred or predefined by the receiving party (e.g., the insurance processor). As will be understood by those of ordinary skill in the art, in alternative embodiments Steps 202-204 may be performed prior to receiving the data in Step 201. In this instance, for example, various actions may be determined and defined for each of the various insurance providers from which the insurance processor receives policy information based on past experience with those insurance providers. Based upon the predefined decision table and corresponding computer program instructions automatically generated therefrom, incoming data can be immediately processed without repeating Steps 202-204 of FIG. 2.

As discussed above, insurance processors receive information from various insurance providers regarding the different policies offered by them. The information, which may require reformatting in the manner described above, may include, for example, a list of providers that are authorized, the benefits that are available, the eligibility requirements, and a complex set of rules and parameters for determining what, if any, benefit to which a particular claimant is entitled. The insurance processor can use this information to process insurance claims received from customers of the insurance providers. According to a typical scenario, each parameter or rule received for each policy of each provider would have to be translated into its own coding structure (i.e., set of computer programming instructions), and processing a claim would require running each set of computer programming instructions sequentially. In addition to being time consuming, this process may prevent a person unfamiliar with basic programming languages from being able to review the translated coding structure in order to verify that that the rules or parameters were translated accurately. In addition, it is a complex and time consuming process to modify or add any rules or parameters in the instance where a particular policy changes.

Exemplary embodiments of the present invention provide an improvement over this typical scenario by enabling the insurance processor to capture the benefit information provided by the insurance providers in a user-friendly format, which can be directly read by a claims processing engine (i.e., a computing application capable of applying various policy rules and conditions to claimant-specific information in order to determine, among other things, what, if any, benefit the claimant is eligible to receive) in order to process an incoming insurance claim. In particular, the claims processing engine is able to extract the necessary information from the user-friendly table, or other similar format, in order to process the claim. The process, therefore, eliminates the requirement of a complex computer program code for each individual rule or parameter. As a result, one can intuitively see what the various rules and conditions are for receiving different benefits, and is able to easily modify and add to those rules and conditions.

Figure 4:
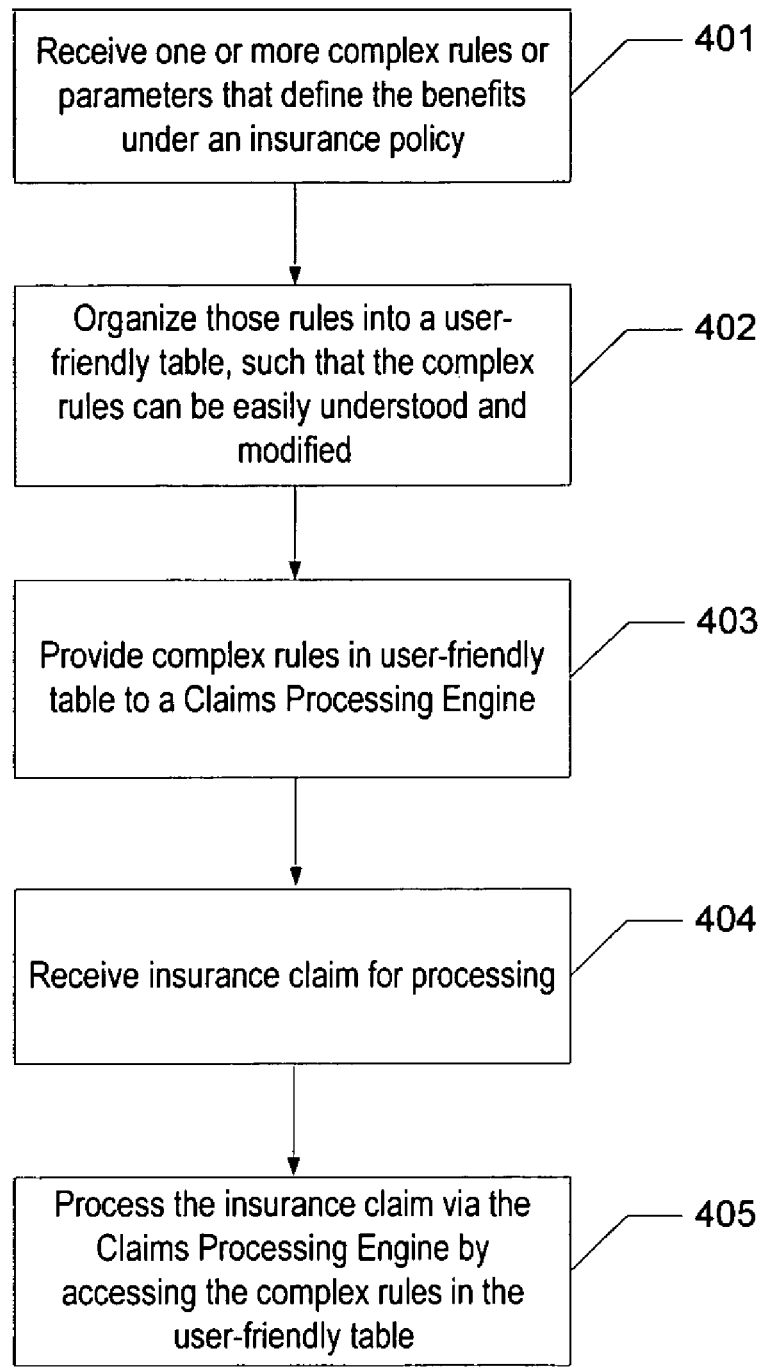
FIG. 4 is a flow chart illustrating a method of converting the insurance-related data received into a user-friendly table and using the table to process insurance claims in accordance with exemplary embodiments of the present invention.

Reference is now made to FIG. 4, which illustrates the steps which may be taken in order to process an insurance claim in the foregoing manner. As shown, in Step 401, one or more complex rules or parameters are received from an insurance provider that define the benefits under a particular insurance policy. These parameters may relate to, for example, the type of procedure (e.g., defining which procedures are covered and which are not), the bill type (e.g., was it for a visit to the hospital, or a stay in a nursing home or mental health facility), a revenue code (e.g., corresponding to the particular service provided), the diagnosis of the patient (e.g., was the patient in critical condition) and/or characteristics of the patient (e.g., age group, gender, race, etc.).

Once the complex rules and parameters have been received, they can be organized, in Step 402, into a user-friendly format, such that the complex rules can be easily understood and modified. This format may include, for example, a table comprising various fields with pull-down options for defining the particular policy. How the table is laid out (i.e., what fields are included and what pull down options there are for each field) is dependent upon the various parameters and rules for the policy. The effect of how the fields are populated on the calculated benefit for the claim being processed is also determined by the parameters or rules of the policy. To illustrate, FIG. 5 is a screen shot of such a user-friendly table that may be used to define a particular policy in accordance with exemplary embodiments of the present invention. As shown, in order to define the policy an individual (e.g., an insurance provider employee) may, for example, first select the organization or line of business for which the policy applies (e.g., SHB-Samp, which may represent a School Board). The individual may then select which benefit plan option he or she is defining (e.g., 00-PPO), as well as what dates for which the service is provided, what provider type the policy pertains to, and the like. A similar table may be created for each policy offered by the particular insurance provider.

Once the user-friendly table has been created and defines the insurance policy including all of the specific rules and parameters, the table may be provided, in Step 403, to the claims processing engine, which is capable of extracting the rules and parameters from the table when processing incoming insurance claim. In particular, in Step 404 an insurance claim from either a provider or a member (i.e., a claimant) is received and in Step 405, the claims processing engine uses the user-friendly table to process the incoming insurance claim. For example, the claims processing engine may use the table and the claimant-specific data extracted from the insurance claim received to determine: (1) if the service on the claim is covered by the policy for the particular recipient; (2) if the provider is authorized to perform the service; (3) if there is a copay, coinsurance or other penalty (e.g., for lack of approval or hospital certification); (4) if the service is in or out of network; (5) which pricing methodology/fee schedule should be used to compute the allowed charges; (6) how much to pay the provider; (7) how much the claimant/patient is responsible to pay; and/or (8) what service limitations apply.

To further illustrate, in one exemplary embodiment, an insurance processor may first use the parameters and rules received from an insurance provider to create a user-friendly table. The table may be specific to a particular policy, or it may be applicable for several policies offered by the same insurance provider, or even still it may be applicable for several policies offered by several insurance providers. As discussed above, its appearance, including the fields and the pull down options for each field, are dictated by the rules and parameters of the corresponding policies. The table, which now defines the particular policy, can then be provided to the claims processing engine that is able to extract the rules/parameters from the user-friendly table in order to determine what, if any, benefit a claimant is entitled to upon receipt of an insurance claim.

In an alternative embodiment, the insurance processor may provide the generated user-friendly table (absent the user-specific data) along with the claims processing engine that is capable of reading the table, to the insurance provider, so that the insurance provider itself is able to process incoming insurance claims from its customers using the table.

As described above, therefore, the method of exemplary embodiments of the present invention enables the party that is processing an insurance claim (whether it be an independent insurance processor or the insurance provider itself) to easily read and comprehend the complex rules and parameters of an insurance policy being administered without requiring that the party be able to read complex programming code. In addition, the table format provides an easy way to change policy parameters and to enter information about particular claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of creating software for reformatting insurance claim related data, said method comprising:
   receiving definition data from one or more insurance providers, wherein the definition data defines one or more insurance policies offered by each of the one or more insurance providers, and wherein the format for at least one of the one or more insurance policies differs from a preferred format for the respective insurance policy;
   creating a decision table based on a combination of conditions for when a respective one of a plurality of reformatting actions should be taken with respect to insurance claim related data received for the at least one of the one or more insurance policies, wherein the respective reformatting action reformats the insurance claim related data received for the at least one of the one or more insurance policies to the preferred format for the respective insurance policy;

providing the decision table to a software generator; and automatically generating computer programming instructions based upon the decision table and configured to cause the respective reformatting action to be taken based on the combinations of conditions from the decision table upon execution thereof, wherein each of the steps of the method is performed by a processor.

2. The method of claim 1, wherein a first party offers the one or more insurance policies to one or more third parties, and wherein a second party processes insurance claims submitted by the third parties under the insurance policies.

3. The method of claim 2, wherein the insurance claim related data comprises data relating to the one or more insurance providers authorized under a respective insurance policy offered by the first party.

4. The method of claim 2, wherein the insurance claim related data comprises data relating to one or more benefits under a respective insurance policy offered by the first party.

5. The method of claim 2, wherein the insurance claim related data comprises data relating to one or more eligibility requirements for a respective insurance policy offered by the first party.

6. The method of claim 1, wherein creating a decision table is repeated for each of the plurality of reformatting actions, such that a different decision table is created for each reformatting action based on a different combination of conditions defining when the reformatting action, with which the decision table is associated, should be taken.

7. The method of claim 6, wherein providing the decision table to the software generator is repeated for each of the different decision tables, such that for each of the different decision tables, a different set of computer programming instructions is automatically generated that causes the respective reformatting action, with which the decision table is associated, to be taken based on the combination of conditions from the decision table.

8. The method of claim 1, wherein the plurality of reformatting actions include moving one field of the insurance claim related data from one location to another location, translating the contents of one field, or looking up the contents of one field in a database.

9. The method of claim 1, further comprising:

receiving insurance claim related data corresponding to the one or more insurance policies; and executing the computer programming instructions to reformat the insurance claim related data received for the at least one of the one or more insurance policies to the preferred format.

10. The method of claim 9, further comprising:

storing a correlation between the insurance claim related data received for the at least one of the one or more insurance policies to the reformatted data in the preferred format.

11. A system for creating software for reformatting insurance claim related data, said system comprising:

a software generator; and a memory device comprising a decision table stored therein and accessible by the software generator, wherein definition data defines one or more insurance policies offered by each of one or more insurance providers, and wherein the format for at least one of the one or more insurance policies differs from a preferred format for the respective insurance policy, said decision table defining a combination of conditions that must occur for a respective one of a plurality of reformatting actions to be taken with respect to insurance claim related data received for the at least one of the one or more insurance policies, wherein the respective reformatting action reformats the insurance claim related data received for the at least one of the one or more insurance policies to the preferred format for the respective insurance policy, and wherein the software generator automatically generates computer programming instructions based upon the decision table and configured to cause the respective reformatting action to be taken based on the combination of conditions from the decision table upon execution thereof.

12. The system of claim 11, wherein a second party processes one or more insurance policy claims received under the one or more insurance policies offered by a first party, and wherein said definition data assists the second party in processing the claims.

13. The system of claim 12, wherein the insurance claim related data comprises data relating to the one or more insurance providers authorized under a respective insurance policy offered by the first party.

14. The system of claim 12, wherein the insurance claim related data comprises data related to one or more benefits under a respective insurance policy offered by the first party.

15. The system of claim 12, wherein the insurance claim related data comprises data related to one or more eligibility requirements for a respective insurance policy offered by the first party.

16. The system of claim 11 further comprising a plurality of decision tables, wherein each of the plurality of decision tables defines a different combination of conditions that must be met in order for a respective one of the plurality of reformatting actions to be taken.

17. The system of claim 16, wherein for each of the plurality of decision tables, the software generator automatically generates a set of computer programming instructions that causes the respective reformatting action, with which the decision table is associated, to be taken based on the combination of conditions from the decision table.

18. A computer program product for reformatting insurance claim related data, wherein the computer program product comprises at least one computer-readable storage medium having computer-readable program code portions stored therein, the computer-readable program code portions comprising:

a first executable portion for receiving a decision table, wherein definition data defines one or more insurance policies offered by each of one or more insurance providers, and wherein the format for at least one of the one or more insurance policies differs from a preferred format for the respective insurance policy, said decision table defining a combination of conditions that must occur for a respective one of a plurality of reformatting actions to be taken with respect to insurance claim related data received for the at least one of the one or more insurance policies, wherein the respective reformatting action reformats the insurance claim related data received for the at least one of the one or more insurance policies to the preferred format for the respective insurance policy; and a second executable portion for automatically generating computer programming instructions based upon the decision table and configured to cause the respective reformatting action to be taken based on the combination of conditions from the decision table upon execution thereof.

19. The computer program product of claim 18 further comprising:
    a third executable portion for enabling a user to create the decision table.

20. The computer program product of claim 18, wherein a first party offers the one or more insurance policies to one or more third parties, and wherein a second party processes one or more insurance policy claims submitted by the third parties under the insurance policies.

21. The computer program product of claim 20, wherein the definition data assists the second party in processing the claims submitted.

22. The computer program product of claim 18, wherein receiving a decision table is repeated for each of the plurality of reformatting actions, such that a different decision table is received for each reformatting action based on a different combination of conditions defining when the reformatting action, with which the decision table is associated, should be taken.

23. The computer program product of claim 22, wherein automatically generating computer programming instructions based upon the decision table is repeated for each of the different decision tables, such that for each of the different decision tables, a different set of computer programming instructions is automatically generated that causes the respective reformatting action, with which the decision table is associated, to be taken based on the combination of conditions from the decision table.

* * * * *